June 9, 1964  R. H. EISENGREIN  3,136,936
MACHINE TOOL CONTROL SYSTEM
Filed Sept. 8, 1958  8 Sheets-Sheet 1

June 9, 1964   R. H. EISENGREIN   3,136,936
MACHINE TOOL CONTROL SYSTEM
Filed Sept. 8, 1958   8 Sheets-Sheet 2
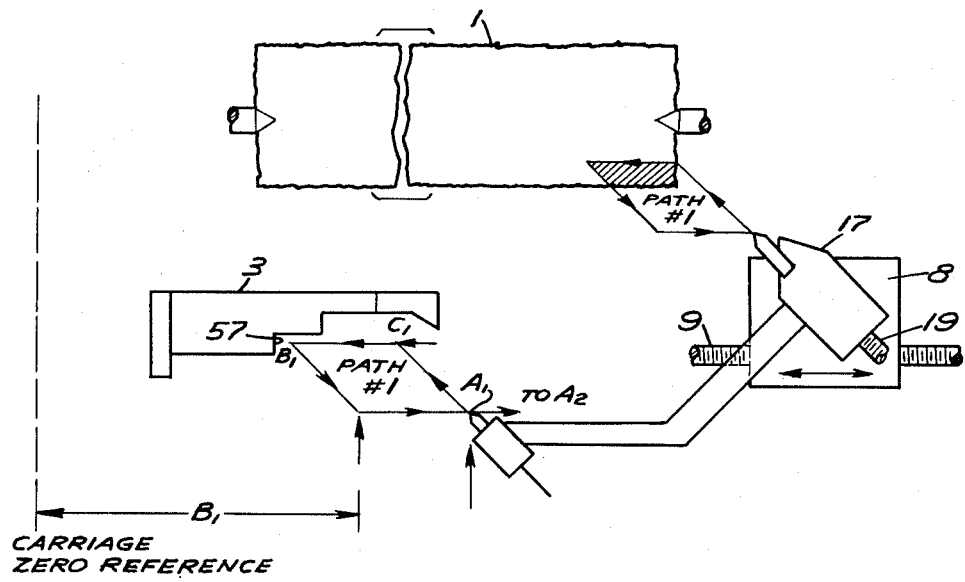
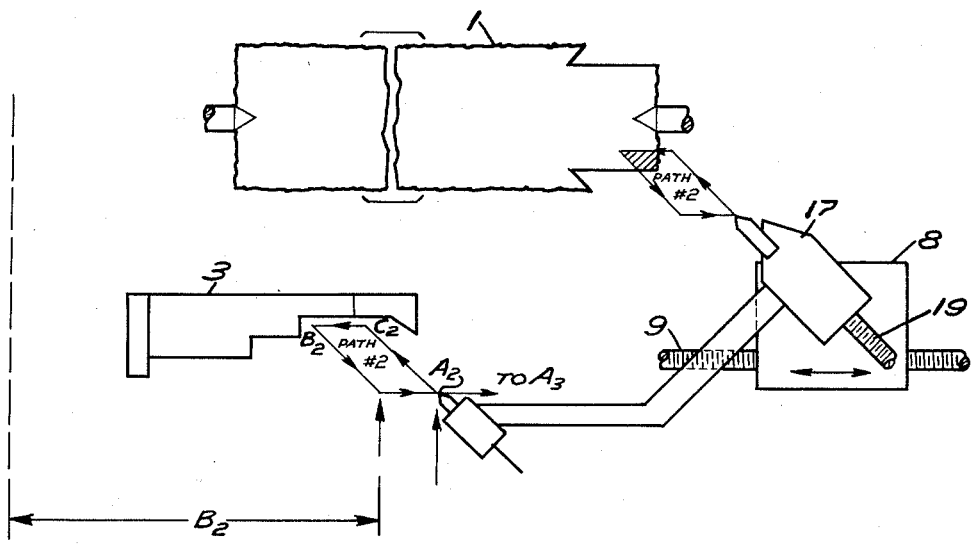
INVENTOR:
ROBERT H. EISENGREIN
BY:
Beau, Brooks, Buckley & Beau,
ATTORNEYS.

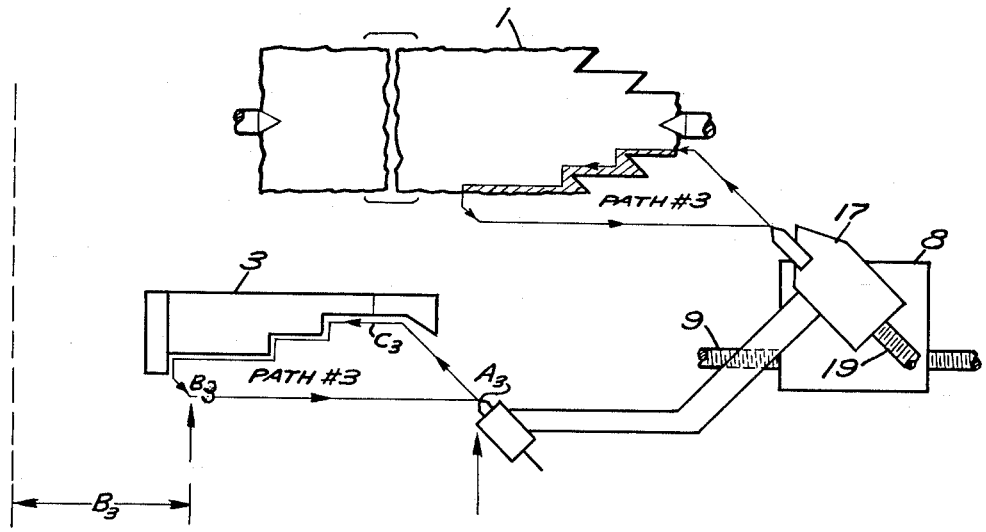
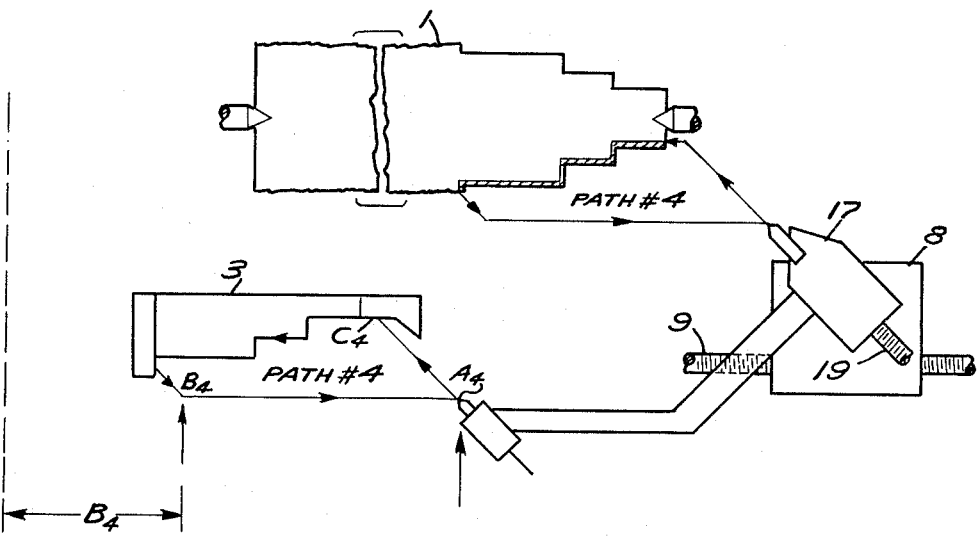

June 9, 1964

R. H. EISENGREIN 3,136,936

MACHINE TOOL CONTROL SYSTEM

Filed Sept. 8, 1958

INVENTOR:
ROBERT H. EISENGREIN
BY:
Beau, Brooks, Buckley & Beau,
ATTORNEYS.

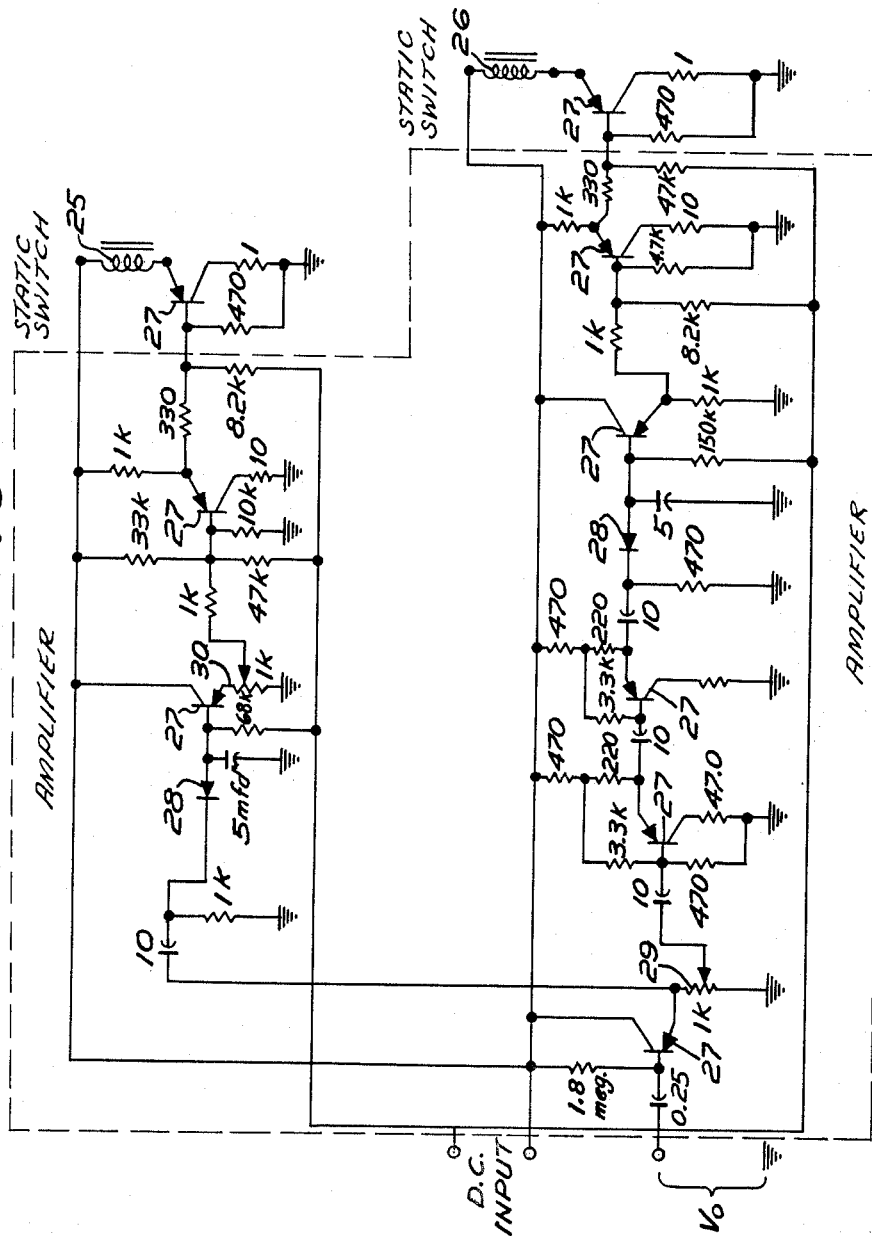

June 9, 1964 R. H. EISENGREIN 3,136,936
MACHINE TOOL CONTROL SYSTEM
Filed Sept. 8, 1958 8 Sheets-Sheet 6

INVENTOR:
ROBERT H. EISENGREIN
BY:
Beau, Brooks, Buckley & Beau,
ATTORNEYS.

June 9, 1964 — R. H. EISENGREIN — 3,136,936
MACHINE TOOL CONTROL SYSTEM
Filed Sept. 8, 1958 — 8 Sheets-Sheet 7

INVENTOR.
Robert H. Eisengrein,
BY
Bean, Brooks, Buckley & Bean
ATTORNEYS.

June 9, 1964 R. H. EISENGREIN 3,136,936
MACHINE TOOL CONTROL SYSTEM
Filed Sept. 8, 1958 8 Sheets-Sheet 8

INVENTOR.
Robert H. Eisengrein,
BY
Bean, Brooks, Buckley & Bean.
ATTORNEYS.

United States Patent Office 3,136,936
Patented June 9, 1964

3,136,936
MACHINE TOOL CONTROL SYSTEM
Robert H. Eisengrein, Skaneateles, N.Y., assignor to Seneca Falls Machine Company, Seneca Falls, N.Y.
Filed Sept. 8, 1958, Ser. No. 759,447
21 Claims. (Cl. 318—162)

This invention relates generally to the control art, and more specifically to a new and useful electric control system primarily for machine tools. By way of example, there is described and illustrated herein one embodiment of the control system of this invention particularly devised for use with tracer lathes, adapted to cut a contour which is a reproduction of a mechanical template, but the utility of the invention is by no means so limited.

In machining shafts on a tracer lathe, there are times when all of the stock to be removed cannot be cut in one pass. Therefore, several roughing passes must be made prior to the template controlled cut. Since each of these roughing cuts may be of a different length and at a different diameter, both the machine carriage and the cross slide must be moved to different positions for each pass.

It is an object of this invention to provide electrical control means automatically operable to move a tracer lathe carriage to one or more predetermined start positions, and to one or more predetermined end cut positions, together with indexing means automatically operable to sequence the carriage where more than one pass is desired.

It is another object of this invention to provide electrical control means automatically operable to move a tracer lathe carriage slide to one or more constant diameter positions, for taking one or more roughing cuts independently of a mechanical template, together with indexing means automatically operable to sequence the slide where more than one pass is desired.

It is also an object of this invention to provide electrical control means automatically operable to trace a mechanical template and position a tracer lathe carriage slide in accord therewith.

Another object of this invention is to provide electrical control means automatically operable to trace a mechanical template and position a tracer lathe carriage slide in accord therewith to cut a part to the same shape as the template but either oversize or undersize by a selectively variable amount on all dimensions.

Still another object of this invention is to provide electrical control means automatically correlating the carriage position control means and the slide position control means.

A further object of this invention is to provide an electrical control system as aforesaid incorporating means automatically operable to transfer the slide control means from a rough cut to a trace mode of operation when the slide assumes a finished diameter position if the slide control means is set for a constant diameter less than the finished diameter as determined by the mechanical template.

A control system constructed in accord with this invention is characterized in one aspect thereof by the provision of means selectively adjustable to provide an electrical reference indicative of a predetermined desired carriage and/or slide position, means electrically comparing the position of the carriage and/or slide to the reference and producing an electrical output proportional to the displacement of the carriage and/or slide from the predetermined desired position thereof, and means responsive to such output for moving the carriage and/or slide to the predetermined desired position.

In another aspect thereof a control system constructed in accord with this invention is characterized by the provision of a displacement sensing device having one part positionally related to the slide and another part movable relative thereto in accord with a mechanical template for producing an electrical reference variable with variations in the template, means electrically comparing the position of the slide with the reference and producing an electrical output proportional to the displacement of the slide from the desired position thereof as determined by the template, and means responsive to such output for moving the slide to the template controlled position.

The foregoing and other objects, advantages and characterizing features of a control system constructed in accord with this invention will become apparent from the ensuing detailed description of a presently preferred tracer lathe embodiment thereof, reference being made to the accompanying drawings wherein like reference numerals denote like parts throughout the various views and wherein:

FIGS. 2, 3, 4 and 5 are corresponding schematic views illustrating sequential passes made to produce the desired final shape;

FIG. 6 is a diagrammatic representation of a control circuit used to measure the displacement of the carriage from the desired position thereof;

FIG. 6A is a diagrammatic representation of a control circuit for the carriage drive speed control clutches;

FIG. 7 is a graphical representation of the mode of operation of the circuit of FIG. 6;

FIG. 8 is a diagrammatic representation of the amplifier and static switching portions of the circuit of FIG. 6;

FIG. 8A is a diagrammatic representation of a control circuit for the forward and reverse carriage drive clutches;

FIG. 9 is a schematic view of a carriage and slide equipped with a template tracing control of the invention;

Figure 1:
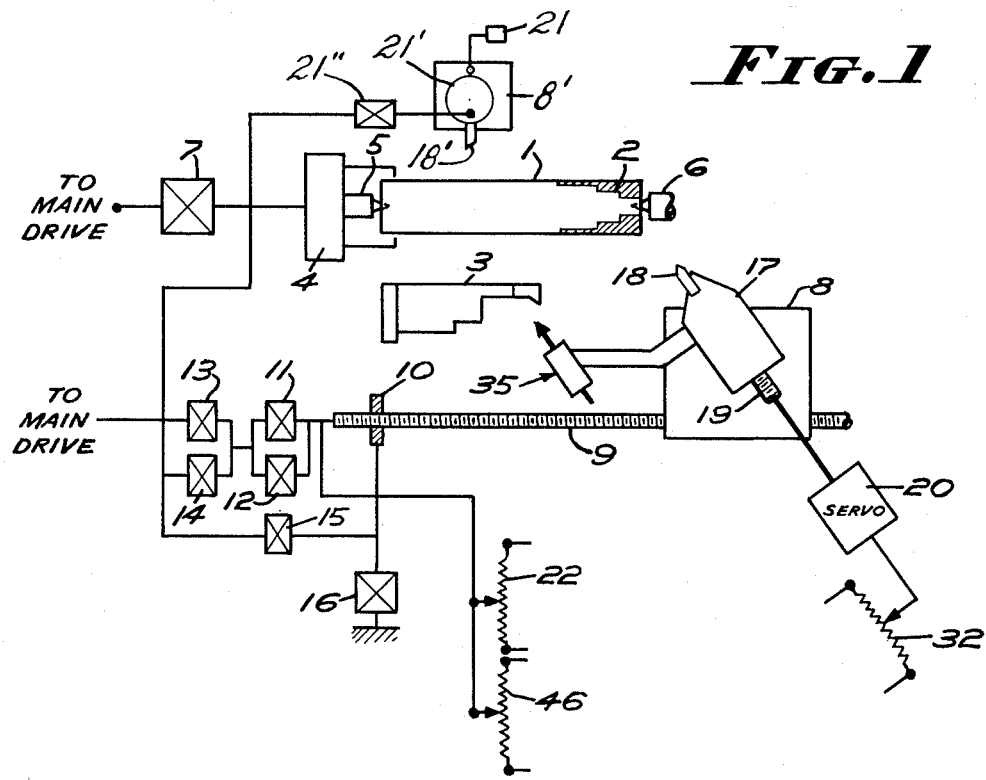
FIG. 1 is a schematic view of a tracer lathe equipped with a control system of the invention.

FIG. 1 illustrates a typical rough shaft 1 and the desired finished surface 2 thereof. As shown, the stock to be removed would vary considerably during the length of one cut controlled from the template. The stock 1 is shown mounted in a tracer lathe of known design, having a spindle 4, headstock 5 and tailstock 6, the spindle being connected to the main drive (not illustrated) through a clutch 7. The carriage 8 is mounted on a drive screw 9 engaging a drive nut 10 and connected to the main drive through forward and reverse clutches 11 and 12, respectively and through feed and rapid clutches 13 and 14, respectively. A boost clutch 15 and boost brake 16 also can be provided. The slide 17 carries tool 18, and has a drive screw 19 driven by a servo motor 20. In addition, there can be provided a back attachment carriage 8' carrying a tool 18' and having a limit switch 21 operated by a cam 21', the carriage being driven from the main drive through a clutch 21". All of the foregoing lathe and lathe drives are known in the art, and comprise per se no part of this invention.

A typical machining procedure for producing the finished surface 2 is shown in FIGS. 2, 3, 4 and 5, from which it will be seen that the procedure utilizes four separate passes. By following this procedure of multiple passes each requiring only limited stock removal, tool life is increased and the likelihood of tool breakage is minimized.

To follow each of the four illustrated paths, the carriage 8 must start and stop at different positions for each pass, so that the tool tip will cut the described contour. In addition, the tool 18 must be positioned to each separate diameter for the respective pass to limit the depth of cut.

Normally, the carriage drive mechanism which moves the tool 18 parallel to the work axis is connected to the main drive motor by a clutch system, as illustrated, although it may also be driven by a separate servo system. Assuming a clutch drive as shown in FIG. 1, the carriage 8 can be made to stop at the desired position by de-energizing the drive clutch at the desired position.

Since the cross slide 17 must have the ability to respond to the mechanical template 3, its drive mechanism must be a power actuator which can supply a continuously varying output speed; for example, the power actuator described in Patents 2,569,585, 2,569,586 and 2,585,507 assigned to Seneca Falls Machine Company, as indicated at 20 in FIG. 1.

Normally slide 17 would be moved inward to the diameter represented by the template 3, and would then trace the remaining portion of the template. The cutting tool 18 would attempt to remove all the stock shown in the shaded area in FIG. 1. However, this amount of stock removal is impractical, and the depth of cut must also be limited by other means; for example, by taking successive depths of cut as represented by tool paths #1, #2, #3, and #4, in order, as shown in FIGS. 2, 3, 4 and 5, the stock removed in each instance being shaded.

The control system of this invention provides a simple and accurate means for varying the start and stop position of the carriage, for each path. The system also provides a simple and accurate means for positioning the cross-feed slide, and thus the cutting tool, to constant diameter positions, and the cross-feed slide can also be automatically positioned in accordance with mechanical template variations. Valuable setup time is minimized, and automatic calibration of the cross-feed and carriage positions is provided.

*System for Carriage Start and End Cut Position Control*

For carriage position control, a multiturn electrical potentiometer 22 (FIG. 6) is coupled to the carriage 8. By exciting the potentiometer with a fixed voltage, V, the potentiometer output will provide a unique voltage, $V_{op}$, for each position of the carriage. The coupling method is designed so that the carriage drive turns the adjustable arm 23 of the potentiometer in proportion to the length of carriage movement.

A second electrical potentiometer is provided for each pass, comprising in the illustrated embodiment four potentiometers 22', 22", 22''' and 22'''', each of which can be manually set by the machine operator and has coupled to it a dial 24 calibrated in inches of carriage travel, whereby potentiometers 22'–22'''' are readily pre-set to desired carriage positions. The potentiometers 22'–22'''' can produce the same output voltage range, by turning the dial, as the potentiometer 22 coupled to the machine carriage.

A typical arrangement of the potentiometers is shown in FIG. 6. The potentiometers are excited by a common voltage, V, and are interconnected to form a standard electrical bridge, with one of potentiometers 22'–22'''' being used at a time. The output voltage, $V_o$, is a function of the arm settings. For example, if both arms (carriage coupled and manually set) are set at the exact midpoint of their range, $V_o$ is zero. As the manually controlled potentiometer is adjusted and its arm moves in one direction, $V_o$ increases in a positive sense. As the manually controlled potentiometer is adjusted and its arm moves in the opposite direction, $V_o$ increases in a negative sense. Thus, $V_o$ indicates the magnitude of the difference between the setting of the manual potentiometer and the carriage coupled potentiometer, and its polarity indicates which direction the machine carriage (and potentiometer) is from the calibration of the manual potentiometer.

By sensing the phase of voltage, $V_o$, the correct clutch 11 or 12 is actuated to drive the carriage 8 and its potentiometer 22 in a direction to reduce $V_o$ to zero. When $V_o$ is zero, the clutch will be de-energized and the carriage will stop.

Referring to FIGS. 2, 3, 4 and 5, unique starting positions $A_1$, $A_2$, $A_3$ and $A_4$ are required for the four passes. For an automatic setup, each potentiometer 22'–22'''' would be set for the unique position $A_1$–$A_4$ required for its pass, and the system sequentially compares the potentiometers 22'–22'''' to the carriage potentiometer 22.

FIG. 7 shows how $V_o$ varies as a function of carriage position from 0" to 100", when the manual potentiometer is set for, say, 40". This graph also indicates how the system may perform several functions prior to the carriage reaching the null position for which the manual potentiometer is set. For example, if the carriage 8 is initially at the 80" point, as shown at D, and the system is energized, the phase $V_o$ is such that the reverse carriage clutch 12 will be energized. The carriage then is forced to move towards the null position (40") at a rapid rate. As the carriage approaches the null position and the output voltage $V_o$ reaches the point marked E, this magnitude of voltage operates relay 25 (FIGS. 6, 6A and 8) and causes the system to switch from a rapid to a feed rate, by switching from clutch 14 to clutch 13. The carriage continues to approach null at this reduced rate, and when the output voltage $V_o$ reaches the point F, relay 26 operates and de-energizes the reverse feed clutch 12 (FIG. 8A), causing the carriage to come to a stop. The points indicated by E and F can be varied to any desired level of voltage $V_o$, as will be described with reference to FIG. 8, and point F will be set very close to the actual null voltage to insure accurate positioning.

From the foregoing, it is seen that the feed clutch coil is energized when $V_o$ is above level F and de-energized when $V_o$ is below level F. The rapid clutch coil is energized when $V_o$ is above level E and de-energized when it is below level E. The connections between clutches 13 and 14 and their relays 26 and 25 (FIGS. 6A and 8A) are of a type known in the art and do not require further description. Switching from one potentiometer 22'–22'''' to another is accomplished automatically by means to be described.

Also, as illustrated in FIGS. 2–5, carriage 8 will assume end cut positions $B_1$, $B_2$, $B_3$ and $B_4$, at which points the carriage will stop feeding forward and the slide will retract. The end cut positions are preset by manually operable potentiometers 46', 46", 46''' and 46'''' (FIG. 16) which are successively compared to a carriage coupled potentiometer 46, producing a carriage forward drive clutch control signal through an amplifier and static switching device and relay 26' (FIG. 8A), all in the manner previously described with reference to the carriage start position control.

Output voltage $V_o$ is electronically amplified so that small changes in carriage position produce large changes in voltage. This amplified voltage triggers a static switching device, either transistor or tube type, which in turn operates the relays 25, 26. The static switching device is comparable to a mechanical limit switch since it is designed to have a very sharp on-off characteristic. The transistor version of the amplifier and static switch circuit is shown in FIG. 8, wherein it is seen that the first three stages merely amplify low level A.C. signals. It is believed that the operation of the circuit of FIG. 8 will be obvious upon inspection, and by analogy to electron tube amplifier and transistor circuits. The values or ratings of the various components, given in FIG. 8, represent a suitable circuit given by way of example only, and are in ohms, Kohms and megohms for the resistances, and microfarads for the capacitances. The transistors 27 are rated 2N383 and the rectifiers 28, IN90. It will be observed that the first A.C. amplifier stage has an adjustable bias resistance 29, and the first stage of the static switching circuit for relay 25 has an adjustable bias resistance 30, which comprises gain controls permitting adjustment of the previously mentioned operating levels F and E. The rectifiers 28 convert A.C. voltage to D.C. voltage and the D.C. signal is further amplified and finally causes the output relays 25, 26 to be switched on or off by very small changes in the input signal $V_o$.

Thus, it is seen that the operator can set dials 24 to the desired carriage start positions $A_1$, $A_2$, $A_3$ and $A_4$, and the carriage will thereafter be moved into these positions under the control of indexing means, to be described, approaching the same first at a rapid rate and then at a feed rate.

The circuit shown in FIG. 8 is not responsive to the phase of $V_o$. For example, it will operate relay 26 and energize the reverse feed clutch whenever $V_o$ is greater than level F, regardless of the phase of $V_o$. This solution is satisfactory for systems which always approach the new start position from the same direction.

For those systems requiring the ability to sense the phase of $V_o$, so as to select the forward or reverse clutch, FIG. 8 may be modified. The rectifier 28 would be replaced by a phase sensing circuit of a type known in the art. Each of the two outputs of the phase sensing circuit would be connected to their own static switching circuit, identical with that shown after the rectifier 28 of FIG. 8. One channel would operate the relay 26 to control the reverse feed clutch. The other channel would now operate the relay 26' to control the forward feed clutch. Thus, when the phase of $V_o$ is positive, the phase sensing circuit would provide the correct polarity D.C. voltage to one of the static switching circuits and operate only relay 26. When the phase of $V_o$ is negative, the phase sensing circuit would provide the correct polarity D.C. signal to the other static switching circuit to operate only relay 26'.

System for Cross-Feed Slide Position

With reference to the machine cross-feed slide 17 essentially the same principles can be used. A potentiometer 32 is coupled to slide 17 (FIGS. 1 and 16) and its voltage compared to a potentiometer which can be manually set to any desired diameter. Here again, several manually controlled potentiometers 32', 32" are used so that a different diameter can be obtained for each pass, the appropriate potentiometer 32', 32" being compared to the slide potentiometer 32, and the voltage resulting being fed through servo amplifier 33 to the servo drive 20 actuating the slide 17. Operation is exactly the same as for the carriage drive clutch servo system previously described. The amplifier output causes the servo motor drive 20 to move the slide 17 and thus the machine potentiometer 32 until the difference voltage equals zero.

The amplified signal also operates a null relay 34 connected across the servo amplifier output. When the difference voltage is not at zero, the amplified signal is large enough to operate the null relay, for a purpose to be described. However, as the slide zeros into position, the signal approaches zero, and at a signal value slightly above zero the null relay 34 is deenergized. Its contacts may be used to energize the carriage feed clutch. Thus, dials corresponding to 24 can be provided to preset potentiometers 32' and 32", which are used for rough cut slide control.

Mechanical Template Tracer Control of Cross-Feed Slide

Another mode of operation for control of the cross-feed slide 17 utilizes a displacement sensing device generally designated 35 which seeks the template contour and provides control signals which vary in magnitude and phase with the magnitude and direction of template contour changes. This system is best illustrated in FIG. 9.

The displacement sensing device utilizes a variable transformer. The housing 36 of the transformer is mounted on the cross-feed slide 17. The core 37 of the linear transformer is mounted in bearings 38 in the housing so that it may move independently in a linear manner in the transformer housing. Attached to one end of the core is a stylus tip 39 which normally contacts the template 3 (FIGS. 1–5) or 3' (FIG. 3). The core is biased by spring 40 to project out of the housing as shown.

Figure 10:
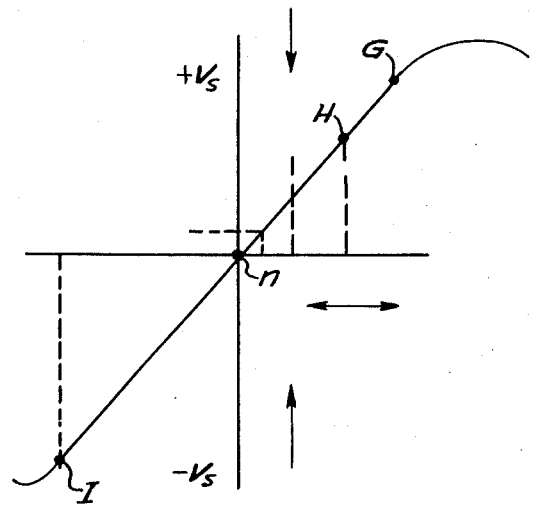
FIG. 10 is a graphical representation of the mode of operation of the trace control of FIG. 9.

One winding 42 of the linear transformer is excited with a fixed voltage; two output windings 43, 44 are magnetically coupled to the fixed excitation winding 42, and are interconnected so that the respective voltages $V_{s1}$ and $V_{s2}$ are of opposing phase. $V_{s1}$ and $V_{s2}$ vary directly with the position of the core in the housing. The curve of FIG. 11 indicates how the voltages vary, and the curve of FIG. 10 shows the resultant voltage $V_s$ which varies from a maximum magnitude in one direction through null to a maximum magnitude in the other direction. The phase of $V_s$ with respect to the excitation voltage is 0° on one side of null, and shifts to 180° on the other side of null.

In operation, the bias spring 40 forces the core 37 out of the housing 36, and the resulting signal $V_s$ causes the servo motor drive 20 to move the slide 17 in a direction towards the template and shaft 1. As the stylus 39 contacts the template 3' (FIG. 9) it is moved in from its maximum projected position G (FIG. 10) and $V_s$ gradually decreases. The slide moves in until $V_s$ is zero at point $n$. If the system happens to move beyond the null point $n$, the phase of $V_s$ reverses and causes the system to drive back towards null. Correct adjustment of the servo amplifier sensitivity will prevent this oscillatory movement.

As the stylus moves in from its initial position at point G, two cams 46, 47 on a rear extension of the core shaft operate switches LSI and LSO at points H and I, respectively. In normal operation, only LSI is actuated since the system stops at point $n$. LSI is set to operate at a predetermined distance from null, and can be used to indicate when the stylus 39 first contacts the template. If by accident, the system continues to move through null, it would eventually actuate switch LSO and indicate a malfunction, and LSO could then retract the slide 17 or shut down the system. In normal operation though, the system would drive only to the null position. The contacts of LSI or the previously mentioned contacts of the null relay 34 can be used to start the carriage feed.

When the carriage starts to move, the stylus 39 is forced to move in or out as the template contour varies in or out. The core 37 moves out by virtue of the spring bias, and moves in by virtue of the template reaction force.

Figure 12:
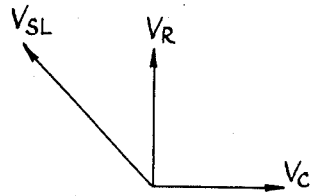
FIGS. 12, 13 and 14 are corresponding vectorial views illustrating the operation of the trace control of FIG. 9 with variations in the template surface being traced.

Assume that the stylus has reached a start position $j$ on the template 3' as shown in FIG. 9. Since the template edge $j$, $k$ is parallel to the ways of the carriage 8, the stylus would be stationary in this range. However, at the first template contour change, as indicated by the right angle corner between $k$ and $l$, the carriage forces the stylus against the template projection. Since the carriage continues to move longitudinally, the stylus is forced further into the housing. As it is moved in, $V_s$ increases in a negative direction and causes the slide to retract from the template at an increasing rate. It continues to retract until a balance condition exists. The vector diagram of FIG. 12 illustrates this condition. To trace the corner without breaking off the stylus, the slide must retract at a velocity $V_{sL}$. The resultant of $V_{sL}$ and the constant carriage velocity $V_c$ causes the stylus to move in the direction of $V_R$. This direction is the desired direction of 90° as indicated by the template contour $k, l$. This motion results because the stylus is mounted on the slide, and the slide is mounted on the carriage. This equilibrium point must be maintained. If the slide velocity $V_{sL}$ is too great, it will move the stylus tip 39 away from the template 3' and the core 37 will move out of the housing. This will cause a decrease in $V_{sL}$. If the slide velocity $V_{sL}$, is too small, the carriage will force the stylus further into the housing and increase $V_{sL}$.

Figure 13:
Figure 14:
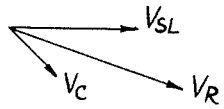

As the contour continues to change at $l, m$ and $n$, the stylus will be constantly repositioned to give the necessary $V_{sL}$ to follow the particular contour angle, and FIGS. 13 and 14 show other combinations of $V_{sL}$ and $V_c$ which produce the various template angles between $l$ and $m$, and $m$ and $n$, respectively. Since $V_s$ may be infinitely varied from zero to positive and negative values, all of the template angles shown may be traced.

Bias Trace Mode of Operation

The system described above will produce a one to one relationship between template contour and the contour 2 reproduced by the cutting tool. This factor may be restated by saying that the distance between the stylus tip and the cutting tool is always maintained at a constant value. An important feature of the control system of this invention is its ability to vary this constant distance between tool tip and stylus tip, either additively or subtractively, by small amounts. This feature permits the system to use one template and produce parts slightly under or oversize. It might be desirable to produce undersize parts to compensate for tool wear. It might be desirable to produce oversize parts so that the final true cut may be made with only small amounts of stock to be removed.

Figure 11:
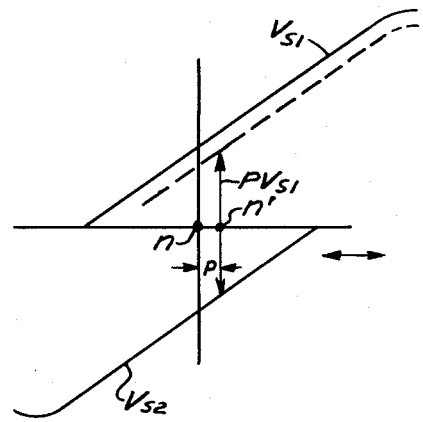
FIG. 11 is a similar view, but illustrating a bias trace mode of operation.

FIG. 11 illustrates how this is done. Under normal conditions, the system drives in to the null position shown at point $n$. At this point, $V_{s1}=V_{s2}$, or $V_{s1}-V_{s2}=0$. If we arbitrarily compare a percentage, P, of $V_{s1}$ to the full value of $V_{s2}$, we will obtain $V_s$ as shown by the following equation: $V_s=P(V_{s1})-V_{s2}$. $V_s$ will now equal zero under the following conditions: $V_{s2}=PV_{s1}$. As indicated by the curve of FIG. 11, this condition can only exist at the bias null point, $n'$. This point will exist at a distance $p$ from the original null $n$. In actual operation then, the system will drive in to the new null point $n'$. Thus, the tool will be displaced, by the distance $d$, from its previous location when the real null was sought at $n$. As the carriage starts to feed, the system will operate as before but about the new bias null.

The percentage of $V_{s1}$ to be used is easily obtained as shown in FIG. 9 by merely switching the input lead to the servo amplifier from position $q$ to position $r$. By utilizing the full value of $C_{s1}$ and taking a percentage $V_{s2}$ (switching from $q'$ to $r'$) the system will conversely trace on the opposite side of null and cut a part undersize.

It will be seen from FIGS. 2–5 that in the instant embodiment the tool 18 has two constant diameter position $C_1$ and $C_2$ for rough cuts, determined by the setting of potentiometers 32' and 32", a variable diameter $C_3$ for a bias trace cut, determined by sensing device 35 and potentiometer 32''' (measured from $r$–$q'$ or $r'$–$q$), and a variable diameter $C_4$ for a finish trace cut, determined by potentiometer 32'''' (measured from $q$–$q'$).

Complete System

In summary, the dials 24 are manipulated to set the potentiometers 22'–22'''' to the desired carriage positions $A_1$–$A_4$ at the start of the successive passes #1–4. The carriage 8 is driven to the successive start positions, first at a rapid rate and then, upon deenergization of relay 25, at a feed rate to complete its approach. When the carriage reaches the desired start position relay 26 is deenergized and stops the carriage drive. Deenergization of relay 26 also closes the energizing circuit for the servo motor 20 of cross-feed slide 17, which latter then is moved in to the desired diameter position $C_1$–$C_4$. When the cross-feed slide reaches the desired diameter position, the carriage 8 is driven, at a feed rate, to the desired end cut position $B_1$–$B_4$. This action is initiated by operation of null relay 34 or stylus controlled switch LSI. The end cut positions $B_1$–$B_4$ are determined by the settings of potentiometers 46'–46'''', and when carriage 8 reaches the desired end cut position relay 26' is deenergized and stops the carriage drive. Deenergization of relay 26' also causes slide 17 to retract, by actuating servo motor 17 in the reverse direction, in the manner indicated in the foresaid power actuator patents. The system then automatically indexes to path #2 conditions, in a manner to be described, and the cycle is repeated.

The foregoing describes the individual carriage and carriage slide control systems. To obtain the type of machine cycling desired, all of the available signals must be correlated to sequence the machine. A conventional stepping switch provides the simplest means for performing this function, since all of the signal information is in the form of low level electrical signals.

Figure 15:
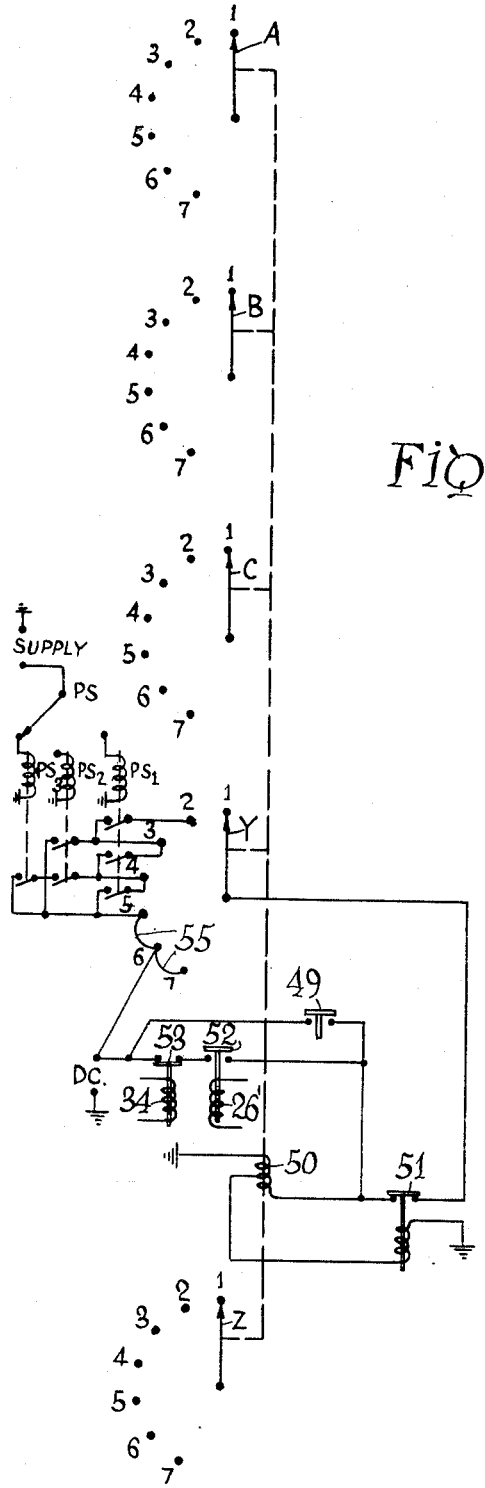
FIG. 15 is a diagrammatic view of a control and indexing device of this invention.

The stepping switch is basically a multi-position, multi-level device for connecting several outputs to a variety of input signals. One form of switch is shown in FIG. 15, and contains three sections A, B and C for switching the start position, end cut, and diameter signals, respectively. The two additional sections Y, Z are for indexing the stepping switch and for controlled sequencing of the machine, respectively. The stepping switch is moved from one position to the next by first energizing its actuator 50 and then deenergizing it, and it can thus be stepped in an orderly fashion, as by a manual indexing switch 49, through each position 1, 2, 3, 4, etc. To index the switch automatically through many steps to a unique position, the actuator coil 50 is energized through an interrupter spring arrangement 51. When power is applied to this circuit, the coil 50 is actuated. Its action opens the interrupter springs 51, power to the coil is cut off, the switch indexes one step, the interrupter contact is reclosed, and power is again applied. This cycle continues automatically until the power is removed by external means. Both techniques are used in the control system of this invention.

Referring now to FIGS. 2 and 15, it is necessary during the first pass to simultaneously switch in signals A1, B1 and C1 to have the tool 18 follow the desired path #1. By sensing when the first pass is completed, for example, when the carriage feed forward relay 26' is deenergized, its contacts can energize the stepping switch actuator 50. Shortly thereafter as the slide 17 retracts, the null relay 34 is energized and its contact 53 can be used to deenergize the stepping switch actuator. As previously mentioned, the process of energizing and then deenergizing the actuator coil 50 causes the stepping switch to index to path #2 information for the second pass. The stepping switch arms are all operatively connected for movement in unison whereby the switch would now feed signals A2, B2 and C2 (FIG. 3) to the appropriate control circuits. When the carriage feed forward stops again and the slide retracts at the end of the pass, the stepping switch indexes to path #3 information (FIG. 4). This procedure continues until path #4 (FIG. 5) is completed.

The stepping switch then is automatically indexed to path #5, in the manner previously described. Now, however, the stepping switch actuator is energized through a contact 5 of the index section of the stepping switch and the interrupter springs 51 of the stepping switch. As previously mentioned, the switch now continues to index automatically until the power to this automatic indexing circuit is removed. The D.C. power through the indexing section and interrupter springs continues to energize the actuator coil 50 from position 5 on by virtue of a series of jumpers 55 which connect positions 5, 6 and 7 of the index section of the stepping switch. The stepping switch will stop automatically indexing the first time one of these jumpers is removed, and if this is done when the stepping switch reaches position 1, it will automatically stop at position 1. Obviously, any number of stepping switch positions can be provided, and any portion thereof can be used for pass control.

Figure 16:
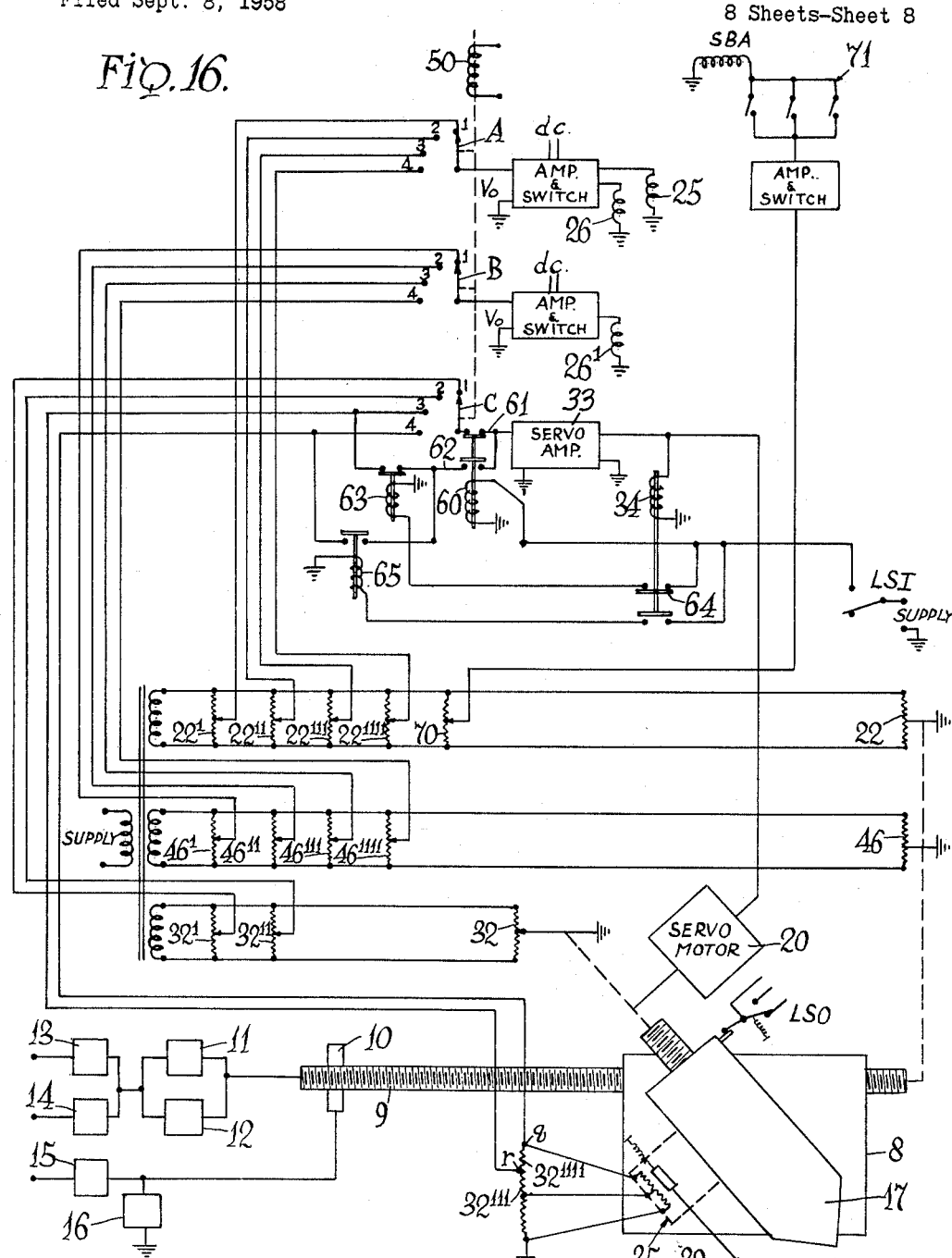
FIG. 16 is a diagrammatic view of the complete control system of this invention, except for part of the device of FIG. 15.

For the system shown in FIG. 16 the slide control automatically operates in the bias trace position during path #3, with the cross-feed slide being positioned in accordance with mechanical template variations as previously discussed. Upon completion of path #3, the system utilizes path #4 information and the cross-feed slide again follows the mechanical template, but traces the part to the finished dimensions. For each of these passes, of course, the appropriate start position potentiometer A1, A2, A3 or A4 and the appropriate end cut potentiometer B1, B2, B3 and B4 would be set to start and stop the machine carriage at the points shown in FIGS. 2–5.

There are several other important and unique control features of this system. One feature enables the automatic switch-over from potentiometer 32', 32" control of the slide 17 to displacement sensing device 35 control thereof. Referring to FIG. 2, path #1 shows the slide 17 moving from its retracted position to constant diameter $C_1$. The carriage 8 then moves from start position $A_1$ to end cut position $B_1$. For path #1, $B_1$ is set so that the slide retracts before the displacement sensing device tip 39 hits template shoulder 57. Since $B_1$ is selectively variable by varying potentiometer 46', it might purposely or inadvertently be set to a position causing the carriage to carry the sensing device tip 39 into shoulder 57. When this happens, the tip 39 is forced into the housing and actuates switch LSI which switches the slide servo amplifier input from the potentiometer signal to the bias trace signal of the sensing device. The slide will now retract at the shoulder and follow the template, avoiding damage to the stylus and an erroneous cut. This is explained by referring to the circuit of FIG. 16. When LSI operates, it energizes relay 60. The contacts of relay 60 switch the servo amplifier input from lead 61 to lead 62. Lead 62 supplies the signal from the displacement sensing device which now causes the slide to move in response to mechanical template variations. Actually, the servo amplifier input can be automatically connected to either the bias trace point $r$, $r'$ or finish trace point $q$, $q'$ of the displacement sensing device. The method of choosing either lead is another unique feature of this system, explained as follows.

When the system has previously zeroed on a constant diameter potentiometer signal $C_1$ or $C_2$, and operation of LSI switches the servo electronic amplifier input to lead 62, the bias trace signal $C_3$ controls the system. This decision is made by connecting lead 62 to the bias trace position $C_3$ through a closed contact of relay 63. Relay 63 is energized by a normally closed contact 64 of the null relay 34. Since the system had previously zeroed on a potentiometer signal $C_1$ or $C_2$, the null relay 34 was deenergized and the above condition existed.

Still another unique feature of this system minimizes set-up time and also provides protection against possible malfunctions caused by system components or the operator. For example, assume the operator inadvertently set the diameter potiometer $C_2$ for path #2 to less than the diameter required by the mechanical template 3, 3'. The cross-feed slide 17 would try to drive in beyond the mechanical template, and the sensing device tip 39 would contact the template and actuate LSI. Again, relay 60 contacts would switch the servo electronic amplifier input from lead 61 to lead 62. Now, since the slide servo system never zeroed on the potentiometer signal, the null relay 34 would remain energized, and lead 62 would be switched to the finish trace position $C_4$ of the displacement sensing device through a closed contact of relay 65, relay 65 being energized by the null relay. The system would complete the cycle in the finish trace mode of operation. The system is thus protected against the previously mentioned mis-setting of the diameter dial.

Therefore, the slide is automatically transferred from potentiometer control to bias trace control if stylus 39 strikes the template after the slide reaches its pre-set constant diameter position, and to finish trace control if the stylus strikes the template before the slide reaches its pre-set constant diameter position.

Another important feature of this system permits the operator to automatically select the number of passes required for most efficient processing of the shaft. The system described has a maximum of four passes available. Actually, the number of passes that can be incorporated in this system is limited only by the number of steps on the stepping switch.

The selection of the number of passes required is achieved by using the selector switch, PS, FIG. 15. Normally, for four pass control, the stepping switch must be manually indexed to position 1 and the machine cycle started. When the carriage reaches $B_1$ position, the stepping switch indexing coil is energized by the closure of a contact 52 on the forward end cut relay 26' and a normally closed contact 53 of the null relay 34 (previously de-energized because the slide servo system zeroed on signal $C_1$). The operation of the forward end cut relay also causes the cross-feed slide to retract, and as the slide retracts the null relay is energized. Its contacts remove power from the stepping switch indexing coil and it indexes to path #2 information. The carriage then returns to #2 start position. Upon reaching #2 start position, relay 26 is operated. Its contacts now cause the carriage slide to move in response to signal $C_2$ and thus cause the entire system to follow path #2.

This cycle repeats itself for each subsequent pass. At the end of the fourth pass, the stepping switch is automatically indexed to position 5. However, power is now applied to the stepping switch indexing coil through stepping switch control contacts 5, and the interrupter spring contacts 51. As the indexing coil is energized and the actuator moves, its action breaks the interrupter spring contacts and the switch indexes to position 6. By shorting all of the remaining stepping switch control contacts together (but not to position 1) the switch will automatically index until it reaches the position for path #1 information. It will then stop. The switches on the control section Z, of the stepping switch can be suitably interlocked with the system sequencing controls to prevent the slide and carriage from following path #1 again until the start cycle push button is again operated.

To limit the number of passes, a pass number selector switch, PS, is used as shown in FIG. 15. When the switch is in position for selecting only two passes, it actuates relay, PS2. Relay PS2 contacts short together the stepping switch index section from position 5 to position 4, to position 3. Therefore, at the end of the second pass, when the stepping switch is normally indexed to position 3 as previously discussed, the formerly described automatic indexing signal will cause the stepping switch to index through all remaining positions until position 1 is reached.

Operation in position 2 will be in the finish trace mode if the operator sets the diameter potentiometer 32"

to any value less than the diameter as determined by the mechanical template. In path #2 this will cause LSI to pick up relay 60, and the null relay 34 will be energized, causing relay 65 to pick up. Thus, signal $C_4$ will cause the slide to operate in finish trace. If the diameter potentiometer is set to a value greater than the diameter as determined by the template, the system will operate from signal $C_2$.

FIG. 16 shows circuitry for also performing auxiliary functions during any particular pass. For example, to start the back attachment carriage on the machine to perform a shoulder squaring operation, the start back attachment potentiometer 70 is conveniently compared to the machine mounted start position potentiometer 22. The signal difference between these settings is amplified by appropriate selection of the back attachment pass number selector switch 71. This amplified signal actuates the clutch control, SBA, to cause the back attachment to cycle.

Accordingly, it is seen that the instant invention fully accomplishes its intended objects, and while only a presently preferred embodiment has been described in detail herein, this has been done by way of example only, without thought of limitation.

Having fully disclosed and completely described my invention, together with its mode of operation, what I claim as new is:

1. A control system for taking multiple passes on a workpiece with a machine tool having a carriage movable in opposite directions and a tool holder movable relative thereto comprising means providing first electrical references indicative of the desired carriage starting positions for the different passes, means electrically comparing the actual carriage position prior to each pass with the first reference indicating the desired carriage starting position for that pass and producing a first control signal, carriage drive means, means responsive to said first control signal for causing said carriage drive means to move the carriage into the desired starting position, means providing second electrical references indicative of desired tool holder positions for the different passes, means electrically comparing the actual tool holder position prior to each pass with the second reference indicative of the desired tool holder position for that pass and producing a second control signal, tool holder drive means, means responsive to said second control signal for causing said tool holder drive means to move the tool holder into the desired position, means providing third electrical references indicative of the desired carriage end cut positions for the different passes, means causing said carriage drive means to feed the carriage from the starting position to the end cut position thereof, means electrically comparing the actual carriage position during each pass with the desired end cut position thereof for that pass and producing a third control signal, means responsive to said third control signal for stopping the carriage feed when the carriage reaches the end cut position thereof for that pass, and means coordinating the operation of said carriage and tool holder drive means in response to said first, second and third control signals whereby the carriage is moved into the desired starting position and the tool holder is moved into the desired position thereof before the carriage is fed to the desired end cut position.

2. A control system as set forth in claim 1, wherein said reference providing means comprise manually adjustable potentiometers for selectively adjusting said references.

3. A control system as set forth in claim 1, wherein said reference providing means comprise manually adjustable means for selecting said references, together with dials coupled to said manually adjustable means, said dials being calibrated in units of measurement thereby to visually indicate the selected references.

4. A control system as set forth in claim 1, wherein said reference providing means comprise manually adjustable potentiometers for selectively adjusting said references, together with dials coupled to said manually adjustable potentiometers, said dials being calibrated in units of measurement thereby visually indicating the selected references, together with indexing means automatically sequencing said first, second and third reference means from one pass to the next, said indexing means including selectively adjustable means automatically indexing said system back to first pass operation upon completion of a preselected number of passes, and means for manually indexing said system through successive passes, said first control signal responsive means causing said carriage drive means to move the carriage at a relatively rapid rate compared to the carriage feed rate whenever the displacement of the actual carriage position from the desired starting position exceeds a predetermined amount, and at a slower rate whenever the displacement of the actual carriage position from the desired starting position is less than said predetermined amount, together with means for selectively varying said predetermined amount of displacement and thereby varying the point at which said first control signal responsive means causes said carriage drive means to switch from said relatively rapid rate to said slower rate, said tool holder drive means moving the tool holder into the desired position upon arrival of the carriage in the desired starting position, together with means automatically operable to cause said tool holder drive means to retract the tool holder upon the carriage reaching the end cut position for that pass.

5. The combination set forth in claim 1, together with indexing means automatically sequencing said first, second and third reference means from one pass to the next.

6. The combination set forth in claim 5, wherein said indexing means include selectively adjustable means automatically indexing said system back for first pass operation upon completion of a preselected number of passes.

7. The combination set forth in claim 5, together with means for manually indexing said system through the conditions of operation for successive passes.

8. The combination set forth in claim 1, wherein said operation coordinating means include means responsive to movement of the tool holder into the desired position thereof for energizing the carriage drive means to feed the carriage to the end cut position for that pass.

9. The combination set forth in claim 1, together with means automatically operable to cause said tool holder drive means to retract said tool holder from said working position upon the carriage reaching said end cut position.

10. A control system for taking multiple passes on a workpiece with a machine tool having a carriage movable in opposite directions and a tool holder movable relative thereto comprising selectively adjustable means providing first electrical references indicative of the desired carriage starting positions for the different passes, means electrically comparing the actual carriage position prior to each pass with the first reference indicating the desired carriage starting position for that pass and producing a first control signal, carriage drive means, means responsive to said first control signal for causing said carriage drive means to move the carriage into the desired starting position, selectively adjustable means providing second electrical references indicative of desired tool holder positions for the different passes, means electrically comparing the actual tool holder position prior to each pass with the second reference indicative of the desired tool holder position for that pass and producing a second control signal, tool holder drive means, means responsive to said second control signal for causing said tool holder drive means to move the tool holder into the desired position, selectively adjustable means providing third electrical references indicative of the desired carriage end cut positions for the different passes, means causing said carriage drive means to feed the carriage from the starting position to the end cut position thereof, means electrically comparing the actual carriage position during each pass with the desired end cut position thereof for that pass and producing a third control signal, means responsive to said third control signal for stopping the carriage feed when the carriage reaches the end cut position thereof for that pass, and means coordinating the operation of said carriage and tool holder drive means in response to said first, second and third control signals whereby the carriage is moved into the desired starting position and the tool holder is moved into the desired position thereof before the carriage is fed to the desired end cut position.

11. The combination set forth in claim 10, wherein said tool holder drive means move the tool holder into the desired position upon arrival of the carriage in the desired starting position.

12. A control system for taking multiple passes on a workpiece with a machine tool having a carriage movable in opposite directions and a tool holder movable relative thereto comprising selectively adjustable means providing first electrical references indicative of the desired carriage starting positions for the different passes, means electrically comparing the actual carriage position prior to each pass with the first reference indicating the desired starting position thereof for that pass and producing a first control signal, carriage drive means, means responsive to said first control signal for causing said carriage drive means to move the carriage into the desired starting position, selectively adjustable means providing second electrical references indicative of desired tool holder positions for the different passes, means electrically comparing the actual tool holder position prior to each pass with the second reference indicative of the desired position thereof for that pass and producing a second control signal, tool holder drive means, means responsive to said second control signal for causing said tool holder drive means to move the tool holder into the desired position, selectively adjustable means providing third electrical references indicative of the desired carriage end cut positions for the different passes, means causing said carriage drive means to feed the carriage from the starting position to the end cut position thereof, means electrically comparing the actual carriage position during each pass with the desired end cut position thereof for that pass and producing a third control signal, means responsive to said third control signal for stopping the carriage feed when the carriage reaches the end cut position thereof for that pass, and means coordinating the operation of said carriage and tool holder drive means in response to said first, second and third control signals whereby the carriage is moved into the desired starting position and the tool holder is moved into the desired position thereof before the carriage is fed to the desired end cut position, wherein the machine tool is designed for operation with a template, and wherein said means providing second electrical references include selectively adjustable means providing a fixed reference and template sensing means providing a variable reference for successively controlling the tool holder position.

13. The combination set forth in claim 12, together with means automatically switching said tool holder position comparing means from said fixed second reference to said variable second reference whenever said fixed reference conflicts with the template as sensed by said template sensing means.

14. The combination set forth in claim 13, wherein said template sensing means include bias trace means and finish trace means, and said automatic switching means switch said tool holder comparing means to said bias trace means in the event of conflict with the template as sensed by said template sensing means after the tool holder has moved to the position indicated by said fixed second reference and to said finish trace means in the event of conflict with the template as sensed by said template sensing means before the tool holder has moved to the position indicated by said fixed second reference.

15. A control system as set forth in claim 13, together with electrical reference bias means for offset positioning of the tool holder relative to the template indicated position thereof.

16. A control system for taking multiple passes on a workpiece with a machine tool having a movable carriage and a tool holder movable relative thereto comprising, means providing references indicative of desired carriage position for the different end passes, means comparing the actual carriage position with the reference indicating the desired carriage position and producing a carriage drive control signal, carriage drive means responsive to said carriage drive control signal, means providing references indicative of desired tool holder position for the different passes, means comparing the actual tool holder position with the reference indicating the desired tool holder position for that pass and producing a tool holder drive control signal, tool holder drive means responsive to said tool holder drive control signal, and means coordinating the operation of said carriage and tool holder drive means in response to said control signals, wherein the machine tool is designed for operation with a template, and wherein said means providing references indicating desired tool holder positions include means providing a pre-selected reference and template sensing means providing a variable reference for successively controlling the tool holder position.

17. The combination set forth in claim 16, wherein said template sensing means include bias trace means and finish trace means.

18. A control system for a machine tool having a movable part and template means indicating the desired position of the part comprising, a variable transformer having a movable core, a sensing stylus coupled to said core and arranged to sense the template means and displace said core in accordance with variations in the template means, said transformer having output windings of opposing phase, means comparing the voltages of said windings to provide a resulting reference signal having an amplitude corresponding to the displacement of the part from the template indicated position thereof, reference signal responsive drive means for the part, and means for selectively comparing less than the full voltage of one of said windings, thereby providing a reference signal causing predetermined offset of the part from the template indicated position thereof.

19. A control system as set forth in claim 18, wherein said last-named means are selectively operable to compare less than the full voltage of either winding, for either oversize or undersize displacement of the part from the template indicated position thereof.

20. A control system for a machine tool having a carriage movable in opposite directions comprising, selectively adjustable means providing a first electrical reference indicative of a desired carriage starting position, electrical signal producing means responsive to the actual carriage position, means comparing said signal and said first reference and producing a first electrical output signal having an amplitude corresponding to the degree of displacement of the actual carriage position from said desired carriage starting position and a polarity corresponding to the direction of such displacement, drive means for the carriage, means responsive to said first output signal for causing said drive means to move the carriage in the proper direction to said desired starting position, selectively adjustable means providing a second electrical reference indicative of a desired carriage end cut position, means for causing said drive means to feed the carriage from said starting position to said end cut position, means comparing said signal and said second reference and producing a second electrical output signal corresponding to the displacement of the actual carriage position from said desired end cut position, and means responsive to said second signal for stopping the carriage feed at said end cut position, wherein said first output signal responsive means causes said drive means to move the carriage at a relatively rapid rate compared to the carriage feed rate whenever the displacement of the actual carriage position from said desired starting position exceeds a predetermined amount, and a slower feed rate whenever the displacement of the actual carriage position from said desired starting position is less than said predetermined amount.

21. The combination set forth in claim 20, together with means for selectively varying said predetermined amount of displacement and thereby varying the point at which said first output signal responsive means causes said drive means to switch from said relatively rapid rate to said slower feed rate.

References Cited in the file of this patent

UNITED STATES PATENTS

| | | |
|---|---|---|
| 2,557,824 | Hornfeck | June 19, 1951 |
| 2,710,934 | Senn | June 14, 1955 |
| 2,784,359 | Kamm | Mar. 5, 1957 |
| 2,831,387 | Ovshinsky | Apr. 22, 1958 |
| 2,866,145 | Peaslee et al. | Dec. 23, 1958 |
| 3,039,035 | Rudolf | June 12, 1962 |